(12) United States Patent
Cooper et al.

(10) Patent No.: US 11,970,868 B2
(45) Date of Patent: Apr. 30, 2024

(54) SYSTEM AND METHOD FOR MANUFACTURING A WIND TURBINE TOWER STRUCTURE

(71) Applicant: General Electric Company, Schenectady, NY (US)

(72) Inventors: Gregory Edward Cooper, Greenfield Center, NY (US); Norman Arnold Turnquist, Sloansville, NY (US); Vitali Victor Lissianski, Schenectady, NY (US); Biao Fang, Clifton Park, NY (US); James Robert Tobin, Simpsonville, SC (US); Pascal Meyer, Niskayuna, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 297 days.

(21) Appl. No.: 17/278,814

(22) PCT Filed: Sep. 28, 2018

(86) PCT No.: PCT/US2018/053466
§ 371 (c)(1),
(2) Date: Mar. 23, 2021

(87) PCT Pub. No.: WO2020/068122
PCT Pub. Date: Apr. 2, 2020

(65) Prior Publication Data
US 2022/0034108 A1    Feb. 3, 2022

(51) Int. Cl.
*B33Y 30/00*         (2015.01)
*E04G 21/04*         (2006.01)
(Continued)

(52) U.S. Cl.
CPC .......... *E04G 21/0427* (2013.01); *B33Y 30/00* (2014.12); *F03D 13/20* (2016.05);
(Continued)

(58) Field of Classification Search
CPC .......... F03D 13/00; F03D 13/10; F03D 13/20; F03D 13/22; F05B 2230/31;
(Continued)

(56) References Cited

U.S. PATENT DOCUMENTS 3,628,698 A * 12/1971 Allen ...................... B65B 3/305
                                                              141/147
2015/0300036 A1    10/2015 Khoshnevis
(Continued)

FOREIGN PATENT DOCUMENTS

CN          104162990              11/2014
CN          105946233 A             9/2016
(Continued)

OTHER PUBLICATIONS

PCT International Search Report & Opinion Corresponding to PCT/US2018/053466 dated Jun. 24, 2019.
(Continued)

*Primary Examiner* — Thu Khanh T. Nguyen
*Assistant Examiner* — Jamel M Nelson
(74) *Attorney, Agent, or Firm* — Dority & Manning, P.A.

(57) ABSTRACT

An additive printing device and a method for using the same to manufacture a tower structure of a wind turbine is provided. The additive printing device includes a vertical support structure, a support ring suspended from the vertical support structure, and a printer head movably coupled to the support ring for selectively depositing cementitious material. A drive mechanism, such as a rack and pinion, moves the printer head around the support ring while selectively depositing cementitious material. The vertical support struc-
(Continued)

ture may be raised and/or the relative position between the vertical support structure and the printer head may be adjusted to raise the printer head to print subsequent layers. This process may be repeated to print the tower structure layer-by-layer from the ground up.

16 Claims, 7 Drawing Sheets

(51) Int. Cl.
*F03D 13/20* (2016.01)
*B33Y 80/00* (2015.01)

(52) U.S. Cl.
CPC .......... *B33Y 80/00* (2014.12); *F05B 2230/31* (2013.01); *F05B 2230/50* (2013.01); *F05B 2230/90* (2013.01)

(58) Field of Classification Search
CPC ............. F05B 2230/50; F05B 2230/60; F05B 2230/90; B33Y 30/00; B33Y 80/00; B28B 1/001; B29C 64/25; B29C 64/209; E04G 21/0427
See application file for complete search history.

(56) References Cited

U.S. PATENT DOCUMENTS

| 2017/0016244 | A1 | | 1/2017 | Keller et al. |
| 2018/0008079 | A1 | * | 1/2018 | Han ................. B33Y 80/00 |
| 2018/0093373 | A1 | * | 4/2018 | Niederberger ........ B29C 64/209 |
| 2020/0086571 | A1 | * | 3/2020 | De La Torre Ugarte Del Castillo ................. B33Y 40/20 |

FOREIGN PATENT DOCUMENTS

| CN | 107322745 | A | * | 11/2017 | |
| CN | 107322754 | A | * | 11/2017 | ............. B28B 1/001 |
| CN | 107322754 | A | | 11/2017 | |
| CN | 108247823 | A | | 7/2018 | |
| KR | 101706473 | B1 | * | 2/2017 | ............. B29C 67/00 |
| KR | 101706473 | B1 | * | 2/2017 | |

OTHER PUBLICATIONS

Youtube, "Jump" System Like a Tower Crane (Webpage Only) https://youtu.be/vx5Qt7_ECEE.
The First Examination Report for IN application No. 202127010803, dated Jul. 18, 2022.
Office Action corresponding to CN201880099845 on Dec. 21, 2023.

* cited by examiner

SYSTEM AND METHOD FOR MANUFACTURING A WIND TURBINE TOWER STRUCTURE

FIELD

The present disclosure relates in general to wind turbine towers, and more particularly to systems and methods for additively manufacturing wind turbine tower structures.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The wind turbine tower is generally constructed of steel tubes, pre-fabricated concrete sections, or combinations thereof. Further, the tubes and/or concrete sections are typically formed off-site, shipped on-site, and then arranged together to erect the tower. For example, one manufacturing method included forming pre-cast concrete rings, shipping the rings to the site, arranging the rings atop one another, and then securing the rings together. As wind turbines continue to grow in size, however, conventional manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g. via bolting and/or welding. Such methods, however, require extensive labor and can be time-consuming.

In view of the foregoing, the art is continually seeking improved methods for manufacturing wind turbine towers. Accordingly, the present disclosure is directed to methods for manufacturing wind turbine tower structures that address the aforementioned issues. In particular, the present disclosure is directed to methods for additively manufacturing wind turbine tower structures on site using automated additive printing devices mounted to an expandable vertical support structure.

BRIEF DESCRIPTION

Aspects and advantages of the invention will be set forth in part in the following description, or may be obvious from the description, or may be learned through practice of the invention.

In one aspect, the present disclosure is directed to an additive printing device for manufacturing a tower structure of a wind turbine. The additive printing device includes a vertical support structure positioned at least partially above the tower structure along a vertical direction and a support ring suspended from the vertical support structure. A printer head is movably coupled to the support ring and is configured for moving around a perimeter of the support ring while selectively depositing cementitious material to form the tower structure.

According to another aspect, the present disclosure is directed to a method of manufacturing a tower structure of a wind turbine. The method includes positioning a vertical support structure above a foundation of the tower structure and suspending a support ring from the vertical support structure. The method further includes movably coupling a printer head to the support ring and printing, using the printer head, one or more layers of the tower structure by selectively depositing cementitious material using the printer head.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
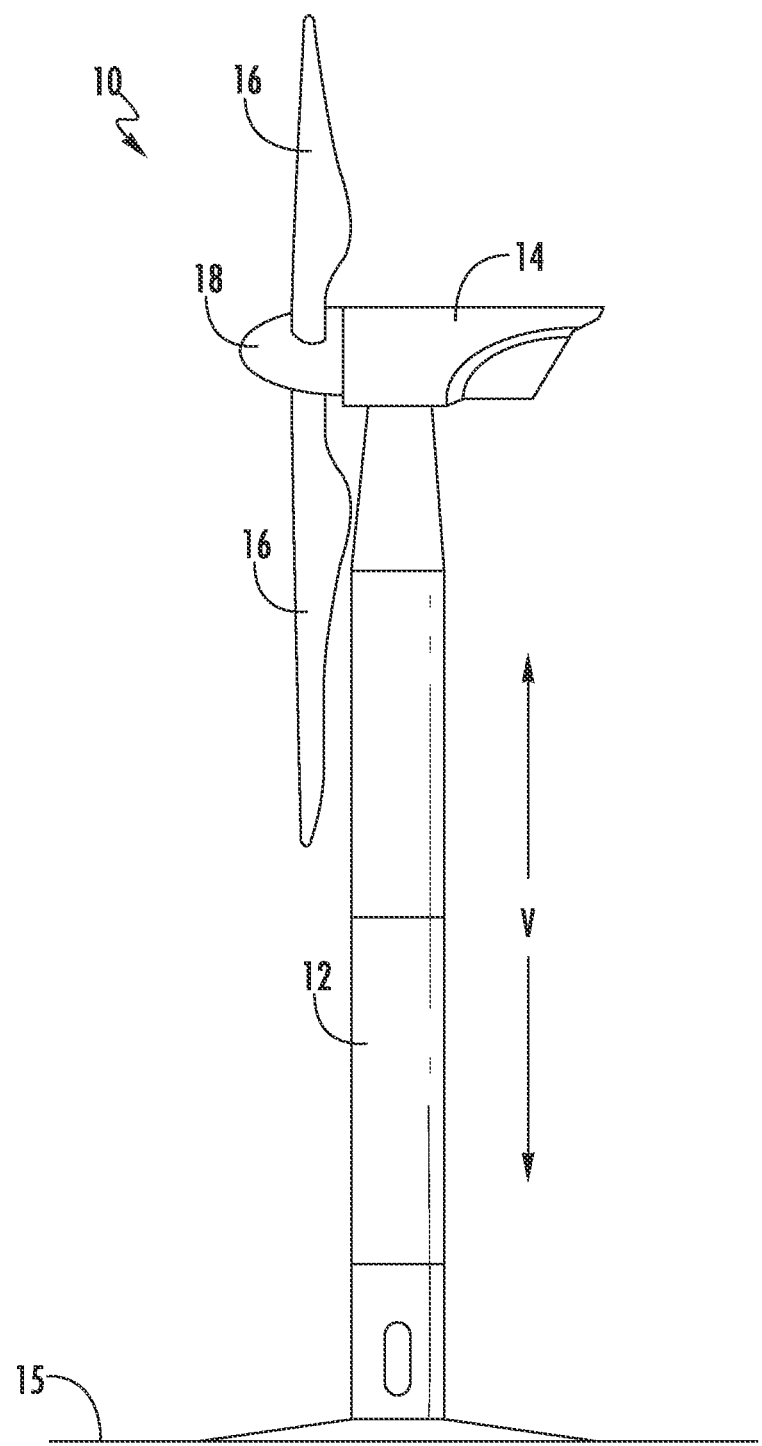
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to an additive printing device and methods for manufacturing wind turbine towers using automated deposition of cementitious materials via technologies such as additive manufacturing, 3-D Printing, spray deposition, extrusion additive manufacturing, concrete printing, automated fiber deposition, as well as other techniques that utilize computer numerical control and multiple degrees of freedom to deposit material. More specifically, methods of the present disclosure include using an automated additive printing device that is supported by an extendable, self-erecting vertical support structure that may include climate control features. In addition, the additive printing device may include modules for adding structural support members such as reinforcement bars, tensioning features such as tensioning cables, and for improving the finish of the tower structure by smoothing, treating, and/or painting the tower structure during or immediately after printing.

Thus, the methods described herein provide many advantages not present in the prior art. For example, the present disclosure may permit on-site printing of tower structures having any desirable size (e.g., greater than four meters in diameter), thereby enabling the construction of larger tower structures and wind turbines. These tall structures may be formed without requiring a tall crane or otherwise being limited by manufacturing or logistics constraints common to prior manufacturing methods. The methods also increase design flexibility, eliminate overall size restrictions, and permit the formation of tower structures having any desirable profile and cross sectional shape. The additive printing device may also utilize any suitable number of printer heads to decrease manufacturing time. Other features and advantages will be apparent to those skilled in the art.

Referring now to the drawings, FIG. 1 illustrates one embodiment of a wind turbine 10 according to the present disclosure. As shown, the wind turbine 10 includes a tower 12 extending from a foundation 15 or support surface with a nacelle 14 mounted atop the tower 12. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbine towers, but may be utilized in any application having concrete constructions and/or tall tower structures in addition to wind towers, including for example homes, bridges, tall towers, and other aspects of the concrete industry. Further, the methods described herein may also apply to manufacturing any similar structure that benefits from the advantages described herein.

Figure 2:
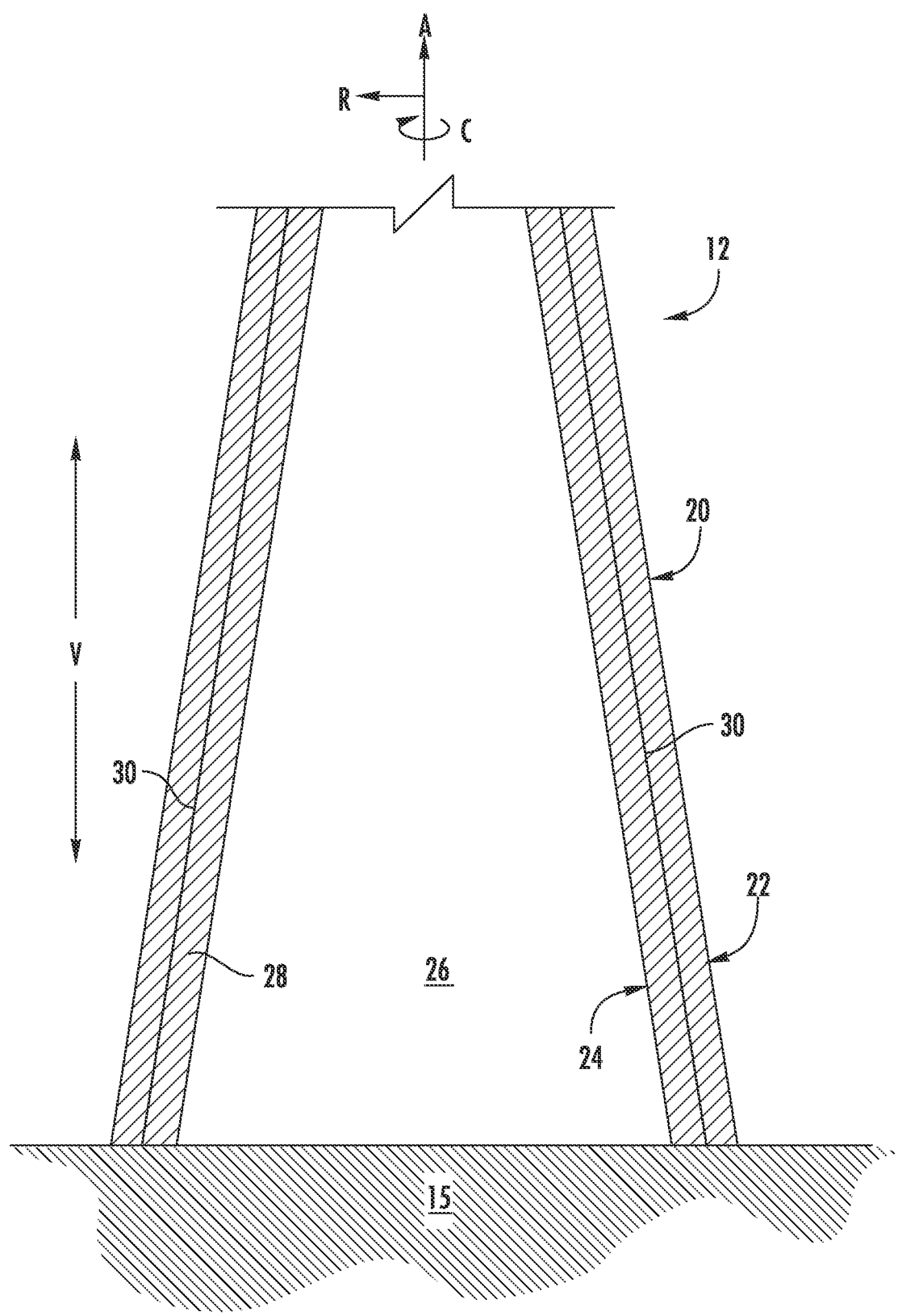
FIG. 2 illustrates a cross-sectional view of one embodiment of a tower structure of a wind turbine according to the present disclosure.

Referring now to FIG. 2, tower structure 12 of a wind turbine 10 will be described in more detail according to an exemplary embodiment of the present subject matter. Specifically, FIG. 2 illustrates a partial, cross-sectional view of one embodiment of the tower structure 12 of the wind turbine 10 according to the present disclosure. As shown, the tower structure 12 defines a circumferential tower wall 20 having an outer surface 22 and an inner surface 24. Further, as shown, the circumferential tower wall 20 generally defines a hollow interior 26 that is commonly used to house various turbine components (e.g. a power converter, transformer, etc.). In addition, as will be described in more detail below, the tower structure 12 is formed using additive manufacturing.

Moreover, as shown, the tower structure 12 is formed of a cementitious material 28 that is reinforced with one or more tensioning cables 30 (FIG. 2), such as elongated cables or wires, helical cables or wires, reinforcing bars (also referred to as rebar), mesh reinforcing fibers (metallic or polymeric), reinforcing metallic rings (circular, oval, spiral and others as may be relevant), and/or couplings. According to exemplary embodiments, cementitious material 28 may be provided through any suitable supply system 32 (see, e.g., FIG. 4). Tensioning cables 30 may be embedded in the cementitious material 28 during the printing process, as described in more detail below. As used herein, the cementitious material 28 may include any suitable workable paste that is configured to bind together after curing to form a structure. Suitable cementitious materials include, for example, concrete, pitch resin, asphalt, clay, cement, mortar, cementitious compositions, or similar materials or compositions.

According to exemplary embodiments of the present subject matter, an adhesive material (not shown) may be provided between one or more of the cementitious material 28 and the foundation 15, the cementitious material 28 and tensioning cables 30, or multiple layers of the cementitious material 28 and tensioning cables 30. Thus, the adhesive material may further supplement interlayer bonding between materials.

The adhesive material described herein may include, for example, cementitious material such as mortar, polymeric materials, and/or admixtures of cementitious material and polymeric material. Adhesive formulations that include cementitious material are referred to herein as "cementitious mortar." Cementitious mortar may include any cementitious material, which may be combined with fine aggregate. Cementitious mortar made using Portland cement and fine aggregate is sometimes referred to as "Portland cement mortar," or "OPC." Adhesive formulations that include an admixture of cementitious material and polymeric material are referred to herein as "polymeric mortar." Any cementitious material may be included in an admixture with a polymeric material, and optionally, fine aggregate. Adhesive formulations that include a polymeric material are referred to herein as "polymeric adhesive."

Exemplary polymeric materials that may be utilized in an adhesive formulation include may include any thermoplastic or thermosetting polymeric material, such as acrylic resins, polyepoxides, vinyl polymers (e.g., polyvinyl acetate (PVA), ethylene-vinyl acetate (EVA)), styrenes (e.g., styrene butadine), as well as copolymers or terpolymers thereof. Characteristics of exemplary polymeric materials are described in ASTM C1059/C1059M-13, Standard Specification for Latex Agents for Bonding Fresh To Hardened Concrete.

Figure 3:
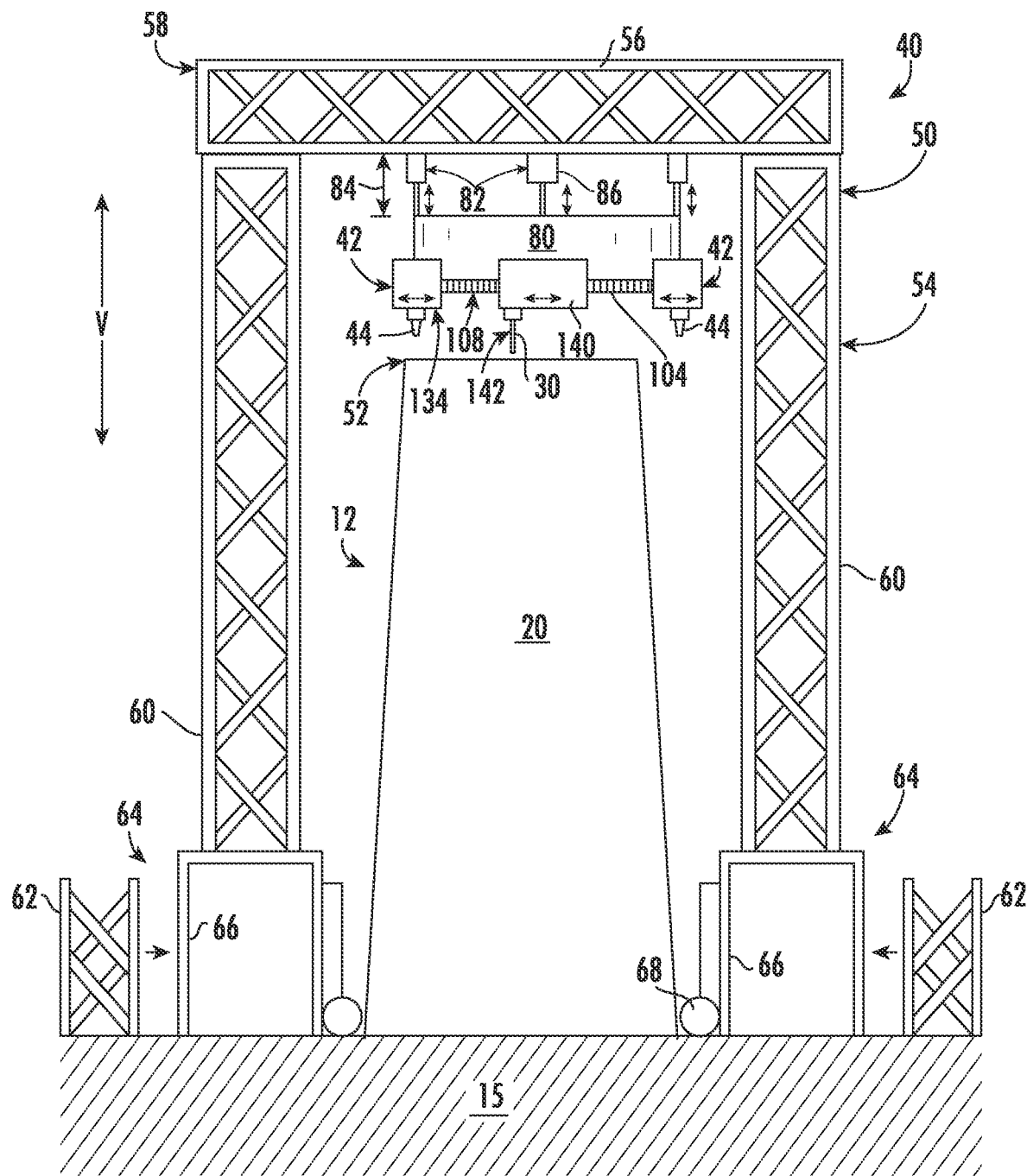
FIG. 3 illustrates a schematic view of an additive printing device that may be used to print the exemplary tower structure of FIG. 2 according to the present disclosure.
Figure 4:
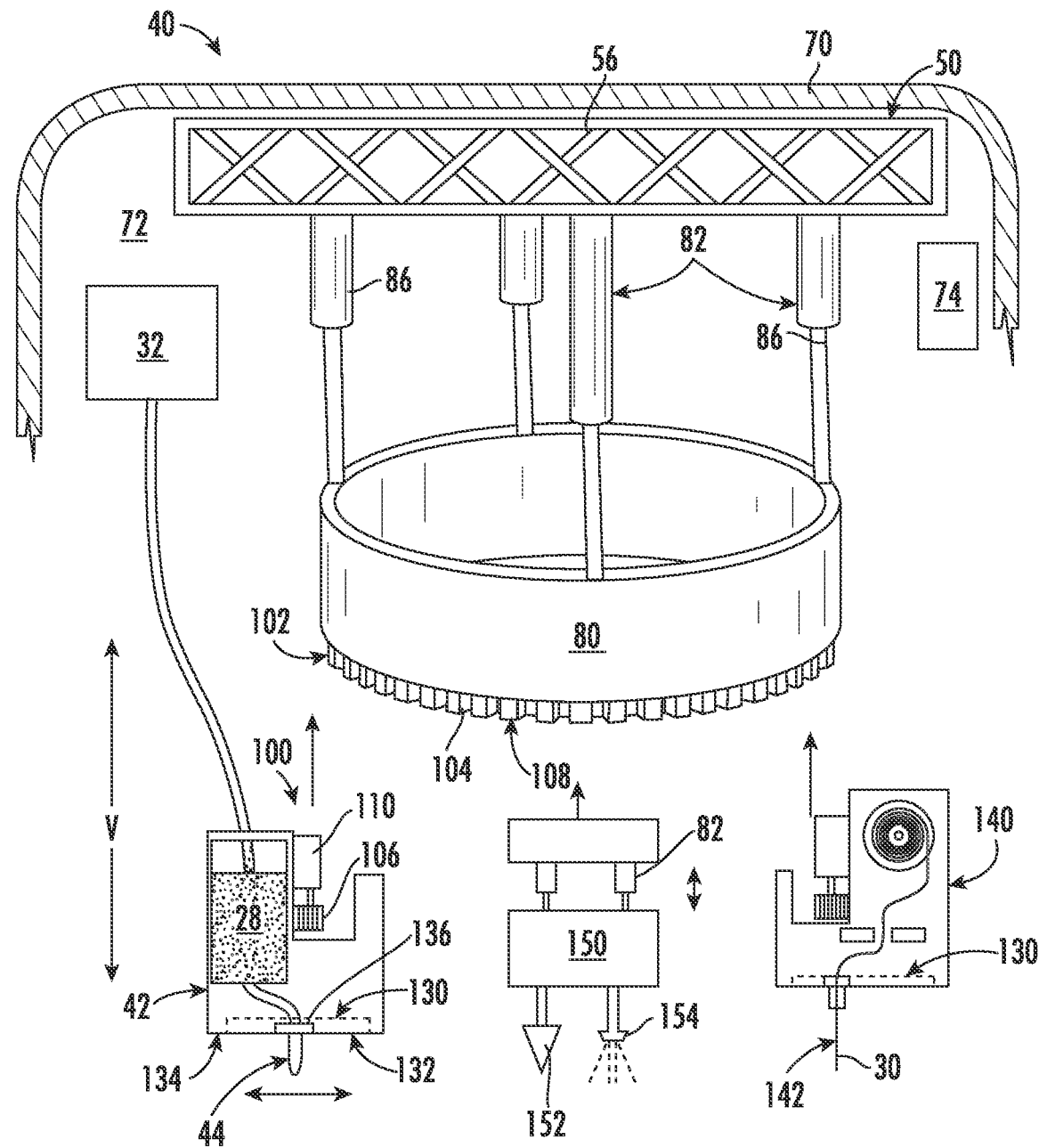
FIG. 4 illustrates a close-up view of certain components of the exemplary additive printing device of FIG. 3 according to the present disclosure.
Figure 5:
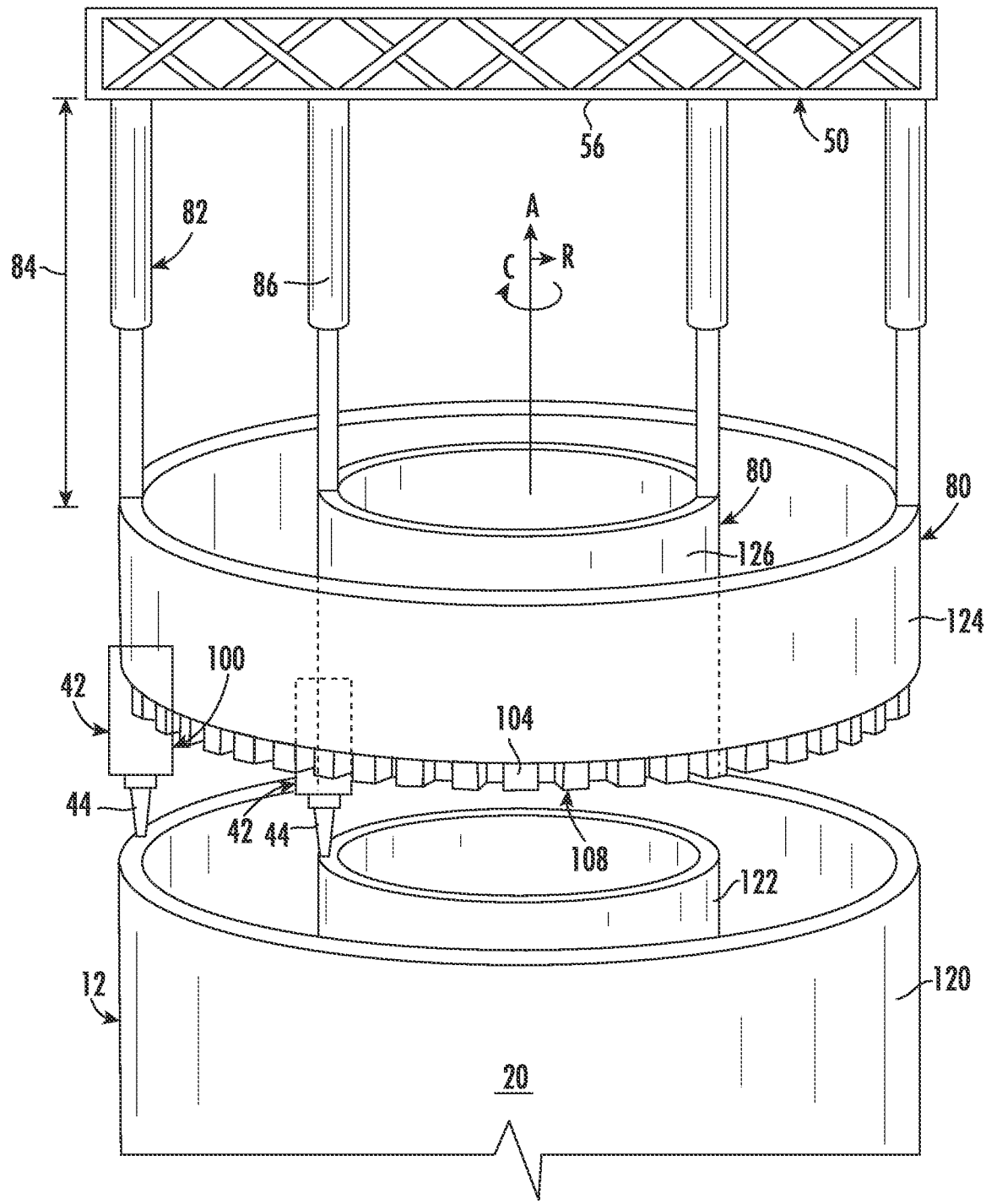
FIG. 5 illustrates another close-up view of certain components of an exemplary additive printing device according to the present disclosure.

Referring now generally to FIGS. 3 through 5 an additive printing device 40 will be described according to an exemplary embodiment of the present subject matter. Notably, all or part of tower structure 12 may be printed, layer-by-layer, using additive printing device 40, which may use any suitable mechanisms for depositing layers of additive material, such as concrete, to form tower structure 12. Thus, aspects of the present subject matter are directed to methods for manufacturing wind turbine towers via additive manufacturing. Additive manufacturing, as used herein, is generally understood to encompass processes used to synthesize three-dimensional objects in which successive layers of material are formed under computer control to create the objects. As such, objects of almost any size and/or shape can be produced from digital model data. It should further be understood that the additive manufacturing methods of the present disclosure may encompass three degrees of freedom, as well as more than three degrees of freedom such that the printing techniques are not limited to printing stacked two-dimensional layers, but are also capable of printing curved and/or irregular shapes.

It should be understood that the additive printing device 40 described herein generally refers to any suitable additive printing device having one or more nozzles for depositing material (such as the cementitious material 28) onto a surface that is automatically controlled by a controller to form an object programmed within the computer (such as a CAD file). More specifically, as shown in FIG. 3 and described below, additive printing device 40 includes one or more printer heads 42 having any suitable number of nozzles 44 and being independently movable to simultaneously print layers of tower structure 12.

Referring still to FIGS. 3 through 5, additive printing device 40 will be described in more detail according to exemplary embodiments of the present subject matter. As illustrated, additive printing device 40 includes a vertical support structure 50 which is generally configured for suspending one or more printer heads 42 above tower structure 12 during the printing process. In this regard, vertical support structure 50 may extend from the ground or from foundation 15 upwards substantially along a vertical direction V to a position at least partially above a top 52 of tower structure 12 (e.g., and also above foundation 15 before the first layer is printed).

As illustrated, vertical support structure 50 includes a plurality of towers 54 and one or more gantry beams 56 that extend between at least two of the plurality of towers at a top 58 of vertical support structure 50. Although two towers 54 and a single gantry beam 56 are illustrated in the FIGS. 3 through 5, it should be appreciated that any suitable number and position of towers 54 may be used according to alternative embodiments. In addition, towers 54 and gantry beams 56 are illustrated as being truss-like structures (e.g. similar to a tower crane), but could be formed in any other suitable manner or have any other configuration according to alternative embodiments.

In addition, although vertical support structure 50 is illustrated as being positioned on the outside of the tower structure 12, it should be appreciated that according to alternative embodiments, vertical support structure 50 may be positioned inside tower structure 12. According to still other embodiments, vertical support structure 50 could include towers 54 positioned both inside and outside of tower structure 12. In addition, additive printing device 40 could be suspended from vertical support structure 50 using any other suitable system or mechanism.

Notably, during the additive printing process, the top 52 of tower structure 12 is build layer-by-layer, rising along the vertical direction V. Therefore, vertical support structure 50 may be an expandable support structure which may be raised along with the height of tower structure 12. In this regard, vertical support structure 50 may be formed from a plurality of stacked segments 60 which are positioned adjacent each other along the vertical direction V and joined to form the rigid vertical support structure 50. When tower structure 12 approaches the top 58 of vertical support structure 50, additional segments 62 may be added to stacked segments 60 to raise the overall height of vertical support structure 50.

Referring specifically to FIG. 3, additional segments 62 may be combined with stacked segments 60 to raise vertical support structure 50 using a jacking system 64. In general, jacking system 64 is positioned proximate foundation 15 and is configured for raising vertical support structure 50 (e.g. including stacked segments 60 and gantry beams 56) and inserting additional segments 62. Specifically, a separate jacking system 64 may be positioned at a bottom of each tower 54.

According to an exemplary embodiment, jacking system 64 includes a jacking frame 66 and a jacking mechanism 68 which are positioned at the bottom of stacked segments 60. Jacking mechanism 68 may generally be any suitable hydraulically, pneumatically, or mechanically actuated system for raising vertical support structure 50. When an additional segments 62 need to be added, a dedicated jacking mechanism 68 simultaneously raises each of towers 54 such that additional segments 62 may be inserted. Specifically, jacking frame 66 may support the weight of vertical support structure 50 as additional segments 62 are positioned below the lowermost stacked segments 60. Additional segments 62 are joined to stacked segments 60 using any suitable mechanical fasteners, welding, etc. This process may be repeated as needed to raise the total height of vertical support structure 50.

In certain situations, it may be desirable to protect tower structure 12 and components of additive printing device 40 from the external environment in which they are being used. Therefore, as shown in FIG. 4, aspects of the present subject matter are directed to the use of a tower cover 70 which may be positioned around vertical support structure 50 to define a controlled environment 72 therein. Tower cover 70 may generally be any suitable material positioned around vertical support structure 70. For example, tower cover 70 may be a fabric-like material draped over or attached to vertical support structure 50 (e.g., over towers 54 and/or gantry beams 56).

In addition, tower cover 70 may include a movable or stationary, rigid or flexible lid positioned on top 58 of vertical support structure 50, on top of support ring 80, or on any other suitable support surface above tower structure 12 for blocking out environmental elements and for maintaining the temperature within tower structure 12. Furthermore, tower cover may define openings or include any other features suitable for protecting controlled environment 72 from environmental elements.

Although tower cover 70 is illustrated in FIG. 4 as a single cover positioned over the entire vertical support structure 50, it should be appreciated that according to alternative embodiments, tower cover 70 may be any suitable number of covers partially covering vertical support structure 50. For example, tower cover 70 may include flat sheets suspended from top 58 of vertical support structure 50. The flat sheets would extend with the growing vertical support structure 50, e.g., by pulling the sheets from a roll at the ground level (with back tension). Furthermore, tower cover 70 may or may not completely enclose the controlled environment 72.

In addition, a climate regulating system 74 may be positioned within controlled environment 72, e.g., for regulating a temperature, humidity, or other environmental factors within controlled environment 72. In this regard, for example, climate regulating system 74 may be a heating system, an air conditioning system, a humidity control system, or any other suitable device for regulating the air within controlled environment 72. For example, climate regulating system 74 may include some kind of device or devices for heating, cooling, dehumidifying, humidifying, etc., along with measurement equipment to monitor temperature, humidity, etc. According to an exemplary embodiment, climate regulating system 74 may be configured for maintaining controlled environment 72 at a temperature suitable for desired curing of cementitious material 28 deposited to form tower structure 12.

In addition, although climate regulating system 74 is illustrated as being positioned within controlled environment 72 (e.g., as defined by tower cover 70), it should be appreciated that according to alternative embodiments, climate regulating system 74 could be positioned within tower structure 12 itself. In this manner, climate regulating system 74 could regulate the temperature and humidity within interior 26 of tower structure, with or without the tower cover 70, to facilitate an improved printing process. Moreover, it should be appreciated that climate regulating system 74 may be a self-contained system or may be monitored and controlled remotely, e.g., using wired or wireless controllers that permit both automatic and manual control.

As mentioned briefly above, vertical support structure 50 is generally configured for supporting one or more printer heads 42 and or other modules which facilitate the formation of tower structure 12. Referring specifically to FIGS. 3 through 5, additive printing device 40 may further include one or more support rings 80 which are suspended from vertical support structure 50, or more specifically from gantry beams 56, above tower structure 12. For example, as illustrated, support ring 80 is mounted to gantry beam 56 using a vertical positioning mechanism 82. In general, vertical positioning mechanism 82 is configured for adjusting a height or vertical distance 84 measured between gantry beam 56 and a top of support ring 80 along the vertical direction V. For example, vertical positioning mechanism 82 may include one or more hydraulic actuators 86 extending between gantry beam 56 and support ring 80 for moving support ring 80 and printer heads 42 along the vertical direction V as tower structure 12 is built up layer-by-layer.

As illustrated, hydraulic actuators 86 are configured for adjusting vertical distance 84 to precisely position nozzles 44 of printer heads 42 immediately above top 52 of tower structure 12. In this manner, the additive printing process may be precisely controlled. However, it should be appreciated that according to alternative embodiments, the vertical motion of printer heads 42 may be adjusted in any other suitable manner. For example, according to exemplary embodiments, support ring 80 may be rigidly fixed to gantry beam 56 while support ring 80 and/or printer heads 40 are used to facilitate vertical motion to precisely position nozzles 44. For example, printer heads 42 may be slidably mounted to support ring 80 using a vertical rail and positioning mechanism to adjust the vertical position relative to support ring 80 and tower structure 12.

According to the illustrated embodiment, printer head 42 is movably coupled to support ring 80 such that nozzles 44 may deposit cementitious material 28 around a perimeter of tower structure 12 while support ring 80 remains rotationally fixed relative to gantry beam 56. In this regard, for example, a drive mechanism 100 may operably couple printer head 42 to support ring 80 such that printer head 42 may be configured for moving around a perimeter 102 of support ring 80 (e.g., about a circumferential direction C) while selectively depositing cementitious material 28. One exemplary drive mechanism 100 is described below and illustrated in the figures, but it should be appreciated that other drive mechanisms are contemplated and within the scope of the present subject matter.

As best shown in FIG. 4, drive mechanism 100 includes a ring gear 104 that is positioned on support ring 80 and a drive gear 106 that is rotatably mounted to printer head 42. Specifically, as illustrated, ring gear 104 is defined on a bottom 108 of support ring 80. Thus, when printer head 42 is mounted on the bottom 108 of support ring 80, drive gear 106 engages ring gear 104. Drive mechanism 100 may further include a drive motor 110 that is mechanically coupled to drive gear 106 for selectively rotating drive gear 106 to move printer head 42 around a perimeter 102 of support ring 80. In this manner, support ring 80 may remain stationary while printer head 42 moves around support ring 80 while depositing cementitious material 28 to form a cross-sectional layer of tower structure 12.

Although drive mechanism 100 is illustrated herein as a rack and pinion geared arrangement using drive gear 106 and ring gear 104, it should be appreciated that any other suitable drive mechanism 100 may be used according to alternative embodiments. For example, drive mechanism 100 may include a magnetic drive system, a belt drive system, a frictional roller drive system, or any other mechanical coupling between printer head 42 and support ring 80 which permits and facilitates selective motion between the two.

Notably, according to the illustrated embodiment, support ring 80 may generally have a diameter that is substantially equivalent to a diameter of tower structure 12. However, it may be desirable to print the tower structure 12 having a non-fixed diameter or a tapered profile. In addition, as illustrated for example in FIG. 5, tower structure 12 may include an outer tower 120 spaced apart along a radial direction R from an inner tower 122. For example, outer tower 120 in inner tower 122 may be printed to define a mold for receiving poured concrete, e.g., to decrease printing time and total construction time.

In order to print outer tower 120 in inner tower 122, additive printing device 40 may include a plurality of concentric support rings 80 and printer heads 42 for simultaneously printing each of the outer tower 120 and the inner tower 122. Specifically, as illustrated, outer support ring 124 may be positioned above outer tower 120 and have a substantially equivalent diameter to outer tower 120. Similarly, inner support ring 126 may be positioned above inner tower 122 and have a substantially equivalent diameter to inner tower 122. It should be appreciated that as used herein, terms of approximation, such as "approximately," "substantially," or "about," refer to being within a ten percent margin of error. According to this exemplary embodiment, each of outer support ring 124 and inner support ring 126 may include dedicated printer heads 42 and/or other modules for facilitating the printing process of outer tower 120 and inner tower 122, respectively.

Referring again to FIG. 4, printer head 42 may include mechanisms for adjusting the position of nozzles 44 on printer head 42. For example, printer head 42 may include a radial adjustment mechanism 130 that is configured for moving print nozzle 44 along the radial direction R. Specifically, according to the illustrated embodiment, radial adjustment mechanism 130 includes a slide rail 132 mounted to a bottom 134 of printer head 42. Slide rail 132 extends substantially along the radial direction and is configured for slidably receiving nozzle 44.

Radial adjustment mechanism 130 may further include an actuating mechanism 136 that moves print nozzle 44 along the radial direction R within slide rail 132. For example, actuating mechanism 136 may include any suitable actuator or positioning mechanism for moving nozzle 44 within slide rail 132. In this regard, for example, actuating mechanism 136 may include one or more of a plurality of linear actuators, servomotors, track conveyor systems, rack and pinion mechanisms, ball screw linear slides, etc. These actuating mechanisms are used only for the purposes of explaining aspects of the present subject matter and are not intended to be limiting in any manner.

Referring still to FIGS. 3 and 4, additive printing device 40 may include any other suitable number of subsystems or modules to facilitate and improved printing process or improved finishing of tower structure 12. For example, as best illustrated in FIG. 4, additive printing device 40 may include a reinforcement module 140 which is movably coupled to support ring 80 and is configured for embedding one or more support members 142 at least partially within tower structure 12. In this regard, for example, reinforcement module 140 may be similar to printer head 42 in that engages support ring 80 and may move around a perimeter 102 of support ring 80 while depositing support members 142.

For example, according to the exemplary embodiments, support members 142 may be reinforcement bars (i.e., rebar), tensioning cables, or any other suitable structural support members, as explained briefly below. For example, as shown in FIG. 2, reinforcement module 140 may embed one or more tensioning cables 30 at least partially within one or more of portions of tower structure 12. In this regard, reinforcement module 140 positions tensioning cable 30 at least partially within tower structure 12. It should be understood that such cables 30 may extend along the entire height of the tower 12 (e.g., as shown in FIG. 2) or along only a portion of the tower height.

According to an exemplary embodiment, as the tower structure 12 is being built up, the additive printing device 40 can alternate between depositing tensioning cables 30 using reinforcement module 140 and printing the cementitious material 28 using printer heads 42 and nozzles 44. Alternatively, as illustrated in FIGS. 3 and 4, reinforcement module 140 may be positioned adjacent printer heads 42 and configured for unwinding or unrolling tensioning cable 30 or rebar into the print area prior to depositing cementitious material 28 such that the tensioning cable 30 becomes embedded within or printed over with cementitious material 28. Alternatively, additive printing device 40 may include any other suitable features for compressing or embedding tensioning cable 30 into cementitious material 28 before it has solidified or cured. In alternative embodiments, the additive printing device 40 is configured to eject the cementitious material 28 with short polymer and/or metallic fibers or rings as reinforcements to improve the structural strength of the tower structure 12.

Tensioning cables 30 may generally be configured for ensuring that the stresses in the cementitious material 28, e.g., concrete, may remain largely compressive. These cables 30 may be pretensioned in cementitious material 28 and may be printed around the cables 30 or the printing process may define holes throughout tower structure 12 through which tensioning cables 30 may be placed after curing, and thereafter post-tensioned. In alternative embodiments, the additive printing device 40 may be configured to provide tension to the cable(s) 30 during printing of the tower structure 12. In such embodiments, additive printing device 40 may vary a tension of the one or more cables 30 as a function of a cross-section of the tower structure 12 during the printing process. Thus, such tensioning cables 30 are configured to manage tensile stresses of the tower structure 12.

In another embodiment, the tower structure 12 may include, for example, a plurality of reinforcing bars that form a metal mesh (not shown) arranged in a cylindrical configuration to correspond to the shape of the tower structure 12. Further, the cylindrical metal mesh can be embedded into the cementitious material 28 of the tower structure 12 before the material 28 cures and periodically along the height of the tower 12. In addition, the additive printing device 40 is configured to print the cementitious material 28 in a manner that accounts for the cure rate thereof such that the tower wall 20, as it is being formed, can bond to itself. In addition, the additive printing device 40 is configured to print the tower structure 12 in a manner such that it can withstand the weight of the wall 20 as the additively-formed cementitious material 28 can be weak during printing.

Referring now specifically to FIG. 4, additive printing device 40 may further include a finishing module 150 that is movably coupled to support ring 80 and is generally configured for improving the finish of tower structure 12 after printing. In this regard, according to the illustrated embodiment, finishing module 150 includes a trowel 152 that is generally configured for smoothing deposited cementitious material 28. In this regard, as finishing module 150 traverses around a perimeter 102 of support ring 80 (e.g. in a manner similar to that described for printer head 42), trowel 12 may slide along outer wall 22 and/or inner wall 24 to smooth the deposited cementitious material 28. Alternatively, finishing module 150 may include a machining system for adding features to a finished surface of tower structure 12, a grinding operation to smooth the finished surface, etc.

In addition, according to an exemplary embodiment, finishing module 150 may further include an applicator such as a spray nozzle 154 which is generally configured for applying any treatment to the inside or the outside of tower structure 12. For example, the treatment may be a sealing agent, a treating agent, adhesives, curing agents, paint, another liquid material, or any other material for improving interlayer bonding to the inside or outside of tower structure 12. It should be appreciated that any suitable nozzle, spray device, or other applicator head may be used for applying such treatments.

Although reinforcement module 140 and finishing module 150 are described herein as facilitating improved printing process by printer head 42, it should be appreciated that aspects of the present subject matter may be directed to the inclusion of any other suitable subsystem or module for improving the quality of tower structure 12, the speed of printing tower structure 12, or any other suitable aspects of the manufacturing process. For example, additive printing device 40 may include any suitable number of printer heads 42 or other modules having any suitable number and configuration of nozzles 44.

In addition, although the description herein refers to tower structure 12 being printed from a single material, e.g., concrete, it should be appreciated that each tower structure 12 may be printed using any suitable material, even if different from other sections. In addition, each tower structure 12 may have any suitable cross sectional profile (e.g., as taken along an axial direction A) and profile (e.g., as defined along the axial direction A). In this regard, as illustrated, tower structure 12 may be substantially cylindrical or have a circular cross section. However, according to still other embodiments, tower structure 12 may be polygonal, elliptical, oval, square, teardrop, airfoil, or any other suitable shape. In addition, according to still another embodiment, tower structure 12 may be tapered or vary in cross-sectional area depending on the vertical position along the tower structure 12.

Figure 6:
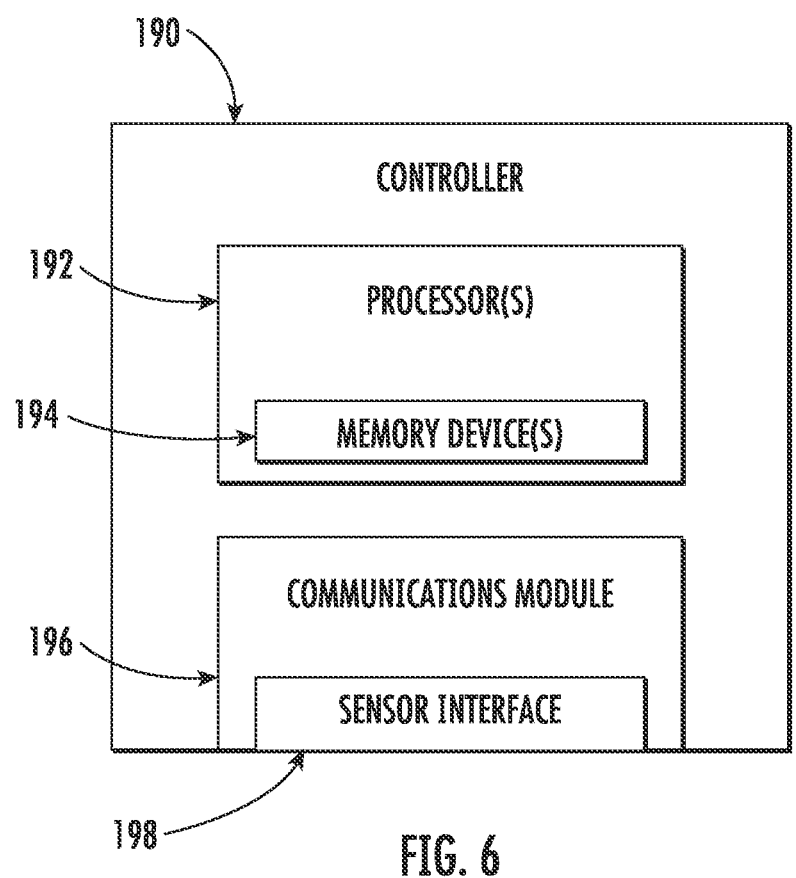
FIG. 6 illustrates a block diagram of one embodiment of a controller of an additive printing device according to the present disclosure.

Referring now to FIG. 6, a block diagram of one embodiment of the controller 190 of the additive printing device 40 is illustrated. As shown, the controller 190 may include one or more processor(s) 192 and associated memory device(s)

194 configured to perform a variety of computer-implemented functions (e.g., performing the methods, steps, calculations and the like and storing relevant data as disclosed herein). Additionally, the controller 190 may also include a communications module 196 to facilitate communications between the controller 190 and the various components of the additive printing device 40. Further, the communications module 196 may include a sensor interface 198 (e.g., one or more analog-to-digital converters) to permit signals transmitted from one or more sensors or feedback devices to be converted into signals that can be understood and processed by the processors 192. It should be appreciated that these sensors and feedback devices may be communicatively coupled to the communications module 196 using any suitable means, e.g., via a wired or wireless connection using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 192 is also configured to compute advanced control algorithms and communicate to a variety of Ethernet or serial-based protocols (Modbus, OPC, CAN, etc.). Additionally, the memory device(s) 194 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 194 may generally be configured to store suitable computer-readable instructions that, when implemented by the processor(s) 192, configure the controller 190 to perform the various functions as described herein.

Figure 7:
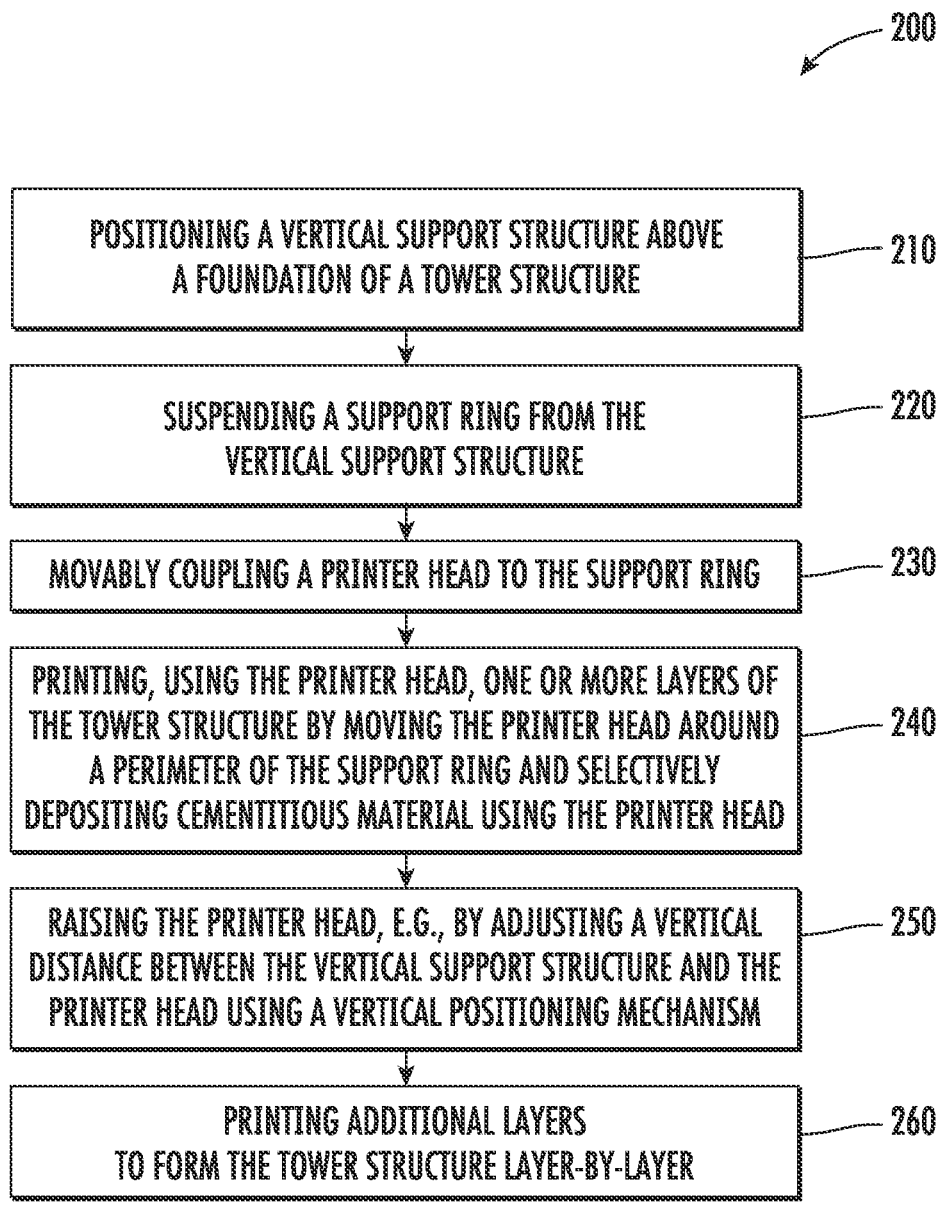
FIG. 7 illustrates a flow diagram of one embodiment of a method for manufacturing a tower structure of a wind turbine according to the present disclosure.

Now that the construction and configuration of tower structure 12 and additive printing device 40 have been presented according to an exemplary embodiment of the present subject matter, an exemplary method 200 for manufacturing a tower structure of a wind turbine using an additive printing device is provided (for example, see FIG. 7). Method 200 can be used to form tower structure 12 using additive printing device 40, or to form any other suitable tower or tall concrete structure using any other suitable additive printing device. In this regard, for example, controller 190 may be configured for implementing method 200. However, it should be appreciated that the exemplary method 200 is discussed herein only to describe exemplary aspects of the present subject matter, and is not intended to be limiting.

As shown in FIG. 7, method 200 includes, at step 210, positioning a vertical support structure above a foundation of a tower structure. In this regard, for example, vertical support structure 50 may be positioned at a wind turbine site directly on the ground or on foundation 15 to commence a printing process. As explained briefly above, vertical support structure 50 may be raised by extending towers 54 using jacking system 64 to build a height of vertical support structure 50 as tower structure 12 is built layer-by-layer along the vertical direction V.

Step 220 includes suspending a support ring from the vertical support structure and step 230 includes movably coupling a printer head to the support ring. In this manner, for example, printer head 42 may be operably coupled to the support ring 80 using vertical positioning mechanism 82, drive mechanism 100, a radial adjustment mechanism 130, or any other suitable mechanisms or devices for movably coupling printer head 42 to support ring 80.

Step 240 includes printing, using the printer head, one or more layers of the tower structure by moving the printer head around a perimeter of the support ring and selectively depositing cementitious material using the printer head. In this regard, for example, drive motor 110 may rotate drive gear 106 which is engaged with ring gear 104 to move printer head 42 around a bottom 108 of support ring 80 while one or more nozzles 44 deposit cementitious material on foundation 15 or on a previous deposited layer of tower structure 12.

Step 250 includes raising the printer head, e.g., by adjusting a vertical distance between the vertical support structure and the printer head using a vertical positioning mechanism. In this regard, for example, the vertical positioning mechanism may be one or more hydraulic actuators that couple vertical support structure 52 and support ring 80. By contrast, one or more hydraulic actuators 86 may be positioned within printer head 42 or another module of additive printing device 40 to facilitate vertical adjustment (e.g., as shown in FIG. 4 for finishing module 150). Step 260 includes printing layers to form the tower structure layer-by-layer. Thus, the process of printing layers of tower structure 12 may be repeated as printer heads 42 are moved along the vertical direction to build tower structure 12 having any suitable height.

FIG. 7 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using tower structure 12 and additive printing device 40 as an example, it should be appreciated that these methods may be applied to the operation of additive printing device to form any suitable tower structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive printing device for manufacturing a tower structure of a wind turbine, the additive printing device comprising:
   a vertical support structure positioned at least partially above the tower structure along a vertical direction;
   an outer support ring suspended from the vertical support structure;
   an inner support ring concentrically positioned within the outer support ring;
   a first printer head movably coupled to the outer support ring, the first printer head configured for moving around a perimeter of the outer support ring while selectively depositing cementitious material to form the tower structure; and a second printer head movably coupled to the inner support ring.

2. The additive printing device of claim 1, further comprising:
a drive mechanism operably coupling the first printer head to the outer support ring, the drive mechanism configured for moving the first printer head around the perimeter of the outer support ring.

3. The additive printing device of claim 2, wherein the drive mechanism further comprises:
a ring gear positioned on the outer support ring;
a drive gear rotatably mounted to the first printer head, the drive gear engaging the ring gear; and,
a drive motor mechanically coupled to the drive gear for selectively rotating the drive gear to move the first printer head about the perimeter of the outer support ring.

4. The additive printing device of claim 1, wherein the vertical support structure further comprises:
a plurality of towers, each of the plurality of towers comprising a plurality of stacked segments, wherein additional segments are added to the plurality of stacked segments to raise the plurality of towers and the vertical support structure.

5. The additive printing device of claim 4, wherein the vertical support structure further comprises:
a gantry beam extending between at least two of the plurality of towers at a top of the vertical support structure, wherein the outer support ring is mounted to the gantry beam above the tower structure.

6. The additive printing device of claim 1, further comprising:
a vertical positioning mechanism operably coupling the first printer head to the vertical support structure, the vertical positioning mechanism configured for moving the first printer head along the vertical direction.

7. The additive printing device of claim 6, wherein the vertical positioning mechanism further comprises:
one or more hydraulic actuators operably coupling the vertical support structure to the outer support ring for adjusting a vertical distance between the vertical support structure and the outer support ring.

8. The additive printing device of claim 1, wherein the first printer head further comprises:
a print nozzle for selectively depositing the cementitious material; and,
a radial adjustment mechanism for moving the print nozzle along a radial direction.

9. The additive printing device of claim 8, wherein the radial adjustment mechanism further comprises:
a slide rail mounted to a bottom of the first printer head and extending along the radial direction; and
an actuating mechanism for moving the print nozzle along the radial direction within the slide rail.

10. The additive printing device of claim 9, wherein the actuating mechanism comprises at least one of a rack and pinion mechanism, a servomotor, or a linear actuator.

11. The additive printing device of claim 1, further comprising:
a reinforcement module movably coupled to the outer support ring, the reinforcement module being configured for embedding one or more support members at least partially within the tower structure.

12. The additive printing device of claim 11, wherein the one or more support members are reinforcement bars or tensioning cables.

13. The additive printing device of claim 1, further comprising:
a finishing module movably coupled to the outer support ring, the finishing module comprising one or more of a trowel for smoothing deposited cementitious material to a finished surface, a machining system for adding features to the finished surface, a grinding operation to smooth the finished surface, and an applicator for applying a treatment to the tower structure.

14. The additive printing device of claim 1, further comprising:
a tower cover defining a controlled environment around the tower structure.

15. The additive printing device of claim 14, further comprising:
a climate regulating system positioned within the controlled environment for regulating a temperature or a humidity within the controlled environment.

16. The additive printing device of claim 1, further comprising:
a climate regulating system positioned within the tower structure.

* * * * *